(12) United States Patent
Slayter

(10) Patent No.: US 8,950,284 B2
(45) Date of Patent: Feb. 10, 2015

(54) BEVEL GEAR FOR GEARBOX

(75) Inventor: Matthew Slayter, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 522 days.

(21) Appl. No.: 13/408,215

(22) Filed: Feb. 29, 2012

(65) Prior Publication Data

US 2013/0220045 A1   Aug. 29, 2013

(51) Int. Cl.
   *F16H 1/14* (2006.01)
   *F16H 55/08* (2006.01)

(52) U.S. Cl.
   CPC .................. *F16H 55/0846* (2013.01)
   USPC .......................... 74/459.5; 74/417

(58) Field of Classification Search
   CPC .................................. F16H 55/0846
   USPC ................................. 74/417, 459.5
   See application file for complete search history.

(56) References Cited

U.S. PATENT DOCUMENTS

| | | | | |
|---|---|---|---|---|
| 1,455,706 A * | 5/1923 | Bower et al. | ............... | 74/459.5 |
| 1,763,177 A * | 6/1930 | Perkins | ............... | 74/459.5 |
| 1,818,554 A * | 8/1931 | Head | ............... | 74/459.5 |
| 2,918,831 A * | 12/1959 | Wildhaber | ............... | 475/234 |
| 2,971,788 A * | 2/1961 | Wildhaber | ............... | 74/459.5 |
| 3,435,697 A * | 4/1969 | Naville | ............... | 74/459.5 |
| 3,703,108 A * | 11/1972 | McCaw | ............... | 475/236 |
| 4,651,587 A * | 3/1987 | Anderson et al. | ............... | 74/459.5 |
| 4,754,661 A * | 7/1988 | Barnett | ............... | 74/459.5 |
| 5,528,952 A * | 6/1996 | Takita et al. | ............... | 74/459.5 |
| 6,324,931 B1 * | 12/2001 | Tsung | ............... | 74/459.5 |
| 7,374,013 B2 * | 5/2008 | Mizuhara et al. | ............... | 180/444 |
| 8,573,087 B2 * | 11/2013 | Stadtfeld | ............... | 74/416 |
| 2009/0241710 A1 * | 10/2009 | Suzuki et al. | ............... | 74/423 |
| 2013/0025394 A1 * | 1/2013 | Fan | ............... | 74/417 |
| 2013/0220045 A1 * | 8/2013 | Slayter | ............... | 74/417 |

* cited by examiner

*Primary Examiner* — Troy Chambers
*Assistant Examiner* — Terence Boes
(74) *Attorney, Agent, or Firm* — Cantor Colburn LLP

(57) ABSTRACT

A gear set is provided for use in a gearbox. The gear set includes a first bevel gear having a first rotational axis and a second bevel gear having a second rotational axis. The second gear is driven by the first gear. The first gear has an outside diameter of about 3.1956 inches, an outer cone distance of about 2.1044 inches, a face width of about 0.62 inches, and a ratio of the outside diameter to a length parallel to the axis of rotation between the crown and the pitch apex of about 1.83. The second gear has an outside diameter of about 2.8337 inches, an outer cone distance of about 2.1044 inches, a face width of about 0.62 inches, and a ratio of the outside diameter to a length parallel to the axis of rotation between the crown and the pitch apex of about 2.33.

18 Claims, 9 Drawing Sheets

BEVEL GEAR FOR GEARBOX

BACKGROUND OF THE INVENTION

The subject matter disclosed herein relates to a gear assembly and, more particularly, to a two-piece bevel gear assembly for use in a gear box.

Misalignment of the gears within a gear train relative to a shaft, bearings, or other components, may increase wear and stress on the gears and contribute to a reduction in gear durability. For instance, axial misalignment of the gears may cause uneven wear of the gear teeth and eventually necessitate replacement. Therefore, bevel gears require a tooth profile uniquely customized for each application to ensure proper tooth contact between meshing gears. Unique tailoring of the gear tooth profiles will limit the effects of movement, tolerance, and thermal expansion on the gear interface.

BRIEF DESCRIPTION OF THE INVENTION

According to one embodiment of the invention, a gear is provided including a generally conical base having an inner end and an outer end at two different positions along a rotational axis. A plurality of teeth extends from the surface of the base between the inner end and the outer end. Each tooth has a root, a pitch, and a face. The outside diameter of the gear is about 2.8337 inches. The outer cone distance of the gear is about 2.1044 inches. The face width of the gear is about 0.62 inches.

According to another embodiment of the invention, a gear is provided including a generally conical base having an inner end and an outer end at two different positions along a rotational axis. A plurality of teeth extends from the surface of the base between the inner end and the outer end. Each tooth has a root, a pitch, and a face. The outside diameter of the gear is about 3.1956 inches. The outer cone distance of the gear is about 2.1044 inches. The face width of the gear is about 0.62 inches. The ratio of the outside diameter to a length parallel to the axis of rotation between the crown and the pitch apex of about 1.83.

According to yet another embodiment of the invention, a gear set is provided including a first bevel gear having a first rotational axis and a second bevel gear having a second rotational axis. The second gear can be driven by the first gear or the first gear can be driven by the second gear. The outside diameter of the first gear is about 2.8337 inches. The outside diameter of the second gear is about 3.1956 inches. The outer cone distance of both the first gear and the second gear is about 2.1044 inches and the face width of both the first gear and the second gear is about 0.62 inches. The ratio of the outside diameter to a length parallel to the axis of rotation between the crown and the pitch apex of about 2.33.

According to yet another embodiment of the invention, a method is provided for installing a gear set in a gearbox of an aircraft including mounting a first gear on a first shaft. A second gear is mounted in meshing engagement with the first gear to a second shaft driven by the first shaft. The first gear has an outside diameter of about 2.8337 inches and the second gear has an outside diameter of about 3.1956 inches. The first gear and second gear have a ratio of the outside diameter to a length parallel to the axis of rotation between the crown and the pitch apex of about 1.83 and about 2.33, respectively. The first gear and second gear have an outer cone distance of about 2.1044 inches and a face width of about 0.62 inches.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of a bevel gear assembly disclosed herein include a first gear coupled to a second gear in a gearbox. Further embodiments are directed to the first and second gears separately.

Figure 1:
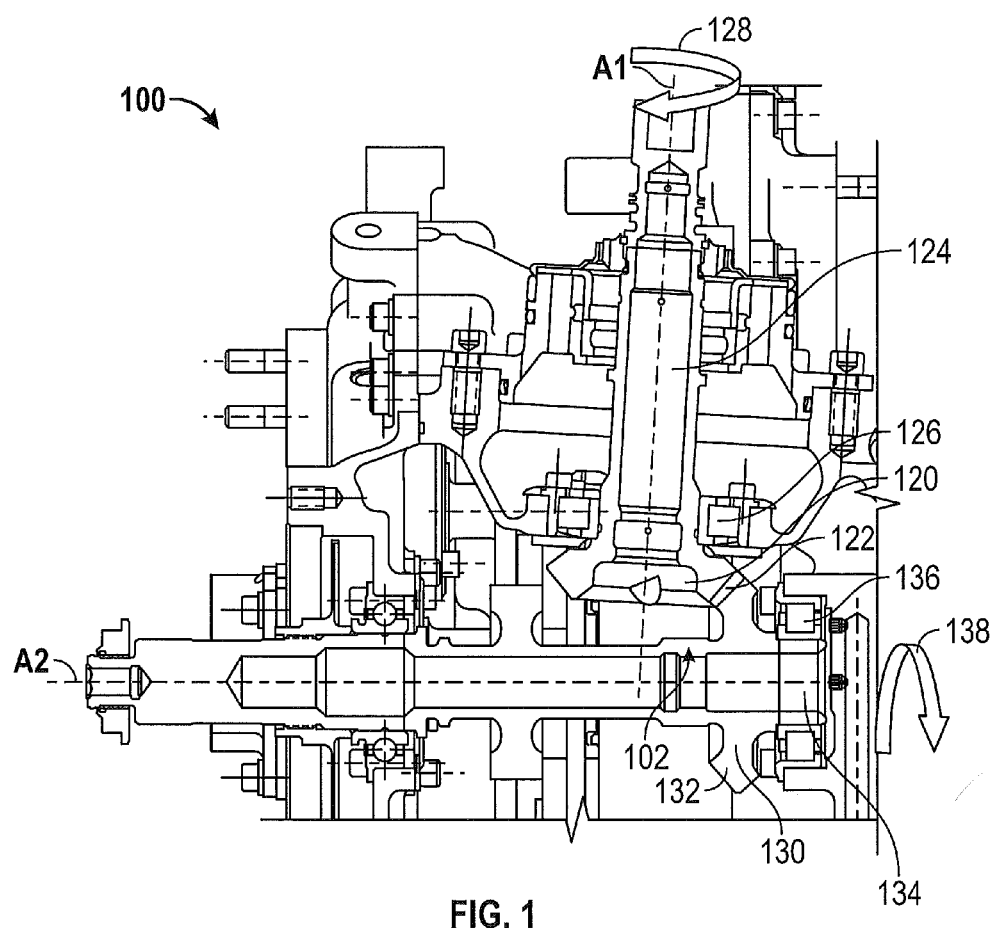
FIG. 1 illustrates a cross-sectional view of an exemplary gearbox with a gear assembly according to an embodiment of the invention.

Referring to the drawings, FIG. 1 illustrates an exemplary gearbox 100. The gearbox 100 may be attached to an engine (e.g., a turbine engine) and includes a gear assembly 102 as part of a gear train for driving any of a number of accessories such as a fuel pump, generator, hydraulic pump, and deoiler, for example. In one embodiment, the gear assembly 102 includes a first gear 120 (also referred to as a "pinion") coupled to a second gear 130, and the tolerances for gears 120, 130 are defined by guidelines established by the American Gear Manufacturers Association (AGMA) for a specific class of gear. The gearbox 100 includes an engine shaft 124 that rotates about a first axis A1 and is supported by at least one bearing assembly 126. In one example, the engine shaft 124 may receive rotational power from an engine such as a turbine engine on an aircraft. The engine shaft 124 supports the first gear 120 that is engaged with the second gear 130. The second gear 130 is supported within the gearbox 100 by a second shaft 134 rotatable about an axis A2 transverse to the engine shaft 124. The second shaft 134 is supported by at least one bearing assembly 136.

The first gear 120 and the second gear 130 mesh to provide the desired transmission of power from the engine shaft 124 to the second shaft 134 and finally to the associated accessories. In one embodiment, rotation of the engine shaft 124 in the direction indicated by arrow 128 causes rotation of the second shaft 134 in the direction of arrow 138. The first gear 120 includes a plurality of teeth 122 that engage a plurality of teeth 132 of the second gear 130. The number of teeth on each of the first gear 120 and the second gear 130 can be selected to provide a desired speed of the second shaft 134, responsive to the input of the engine shaft 124, to drive the accessories. In one embodiment, the first gear 120 has 29 teeth and the second gear 130 includes 33 teeth. In another embodiment, the number of teeth on the first gear 120 and the second gear 130 may vary. Also, variations in part fabrication and assembly can result in some relative movement between the first gear 120 and the second gear 130. Consequently, such movements and variations are accommodated in the design of the mating interface between the first and second gears 120, 130.

Figure 2:
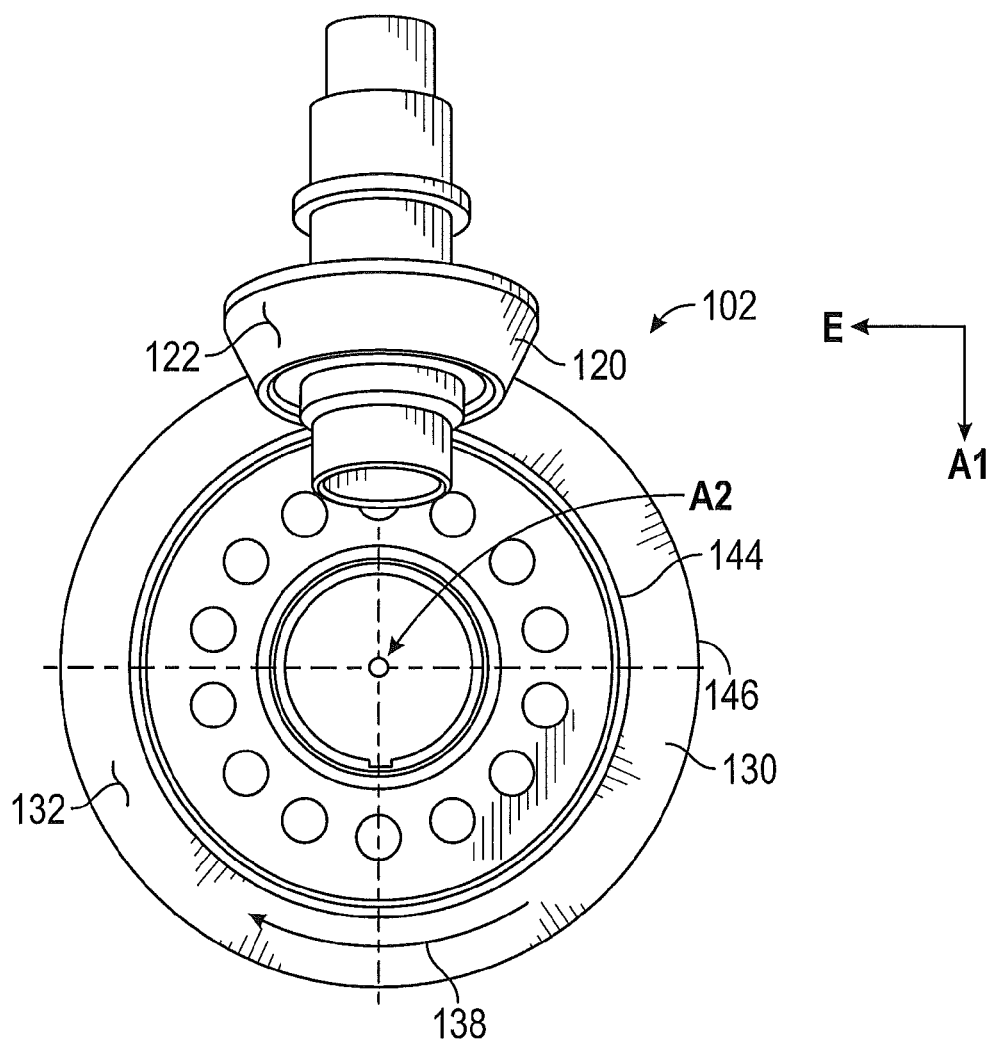
FIG. 2 is a perspective view of the gear assembly of FIG. 1 according to an embodiment of the invention
Figure 3:
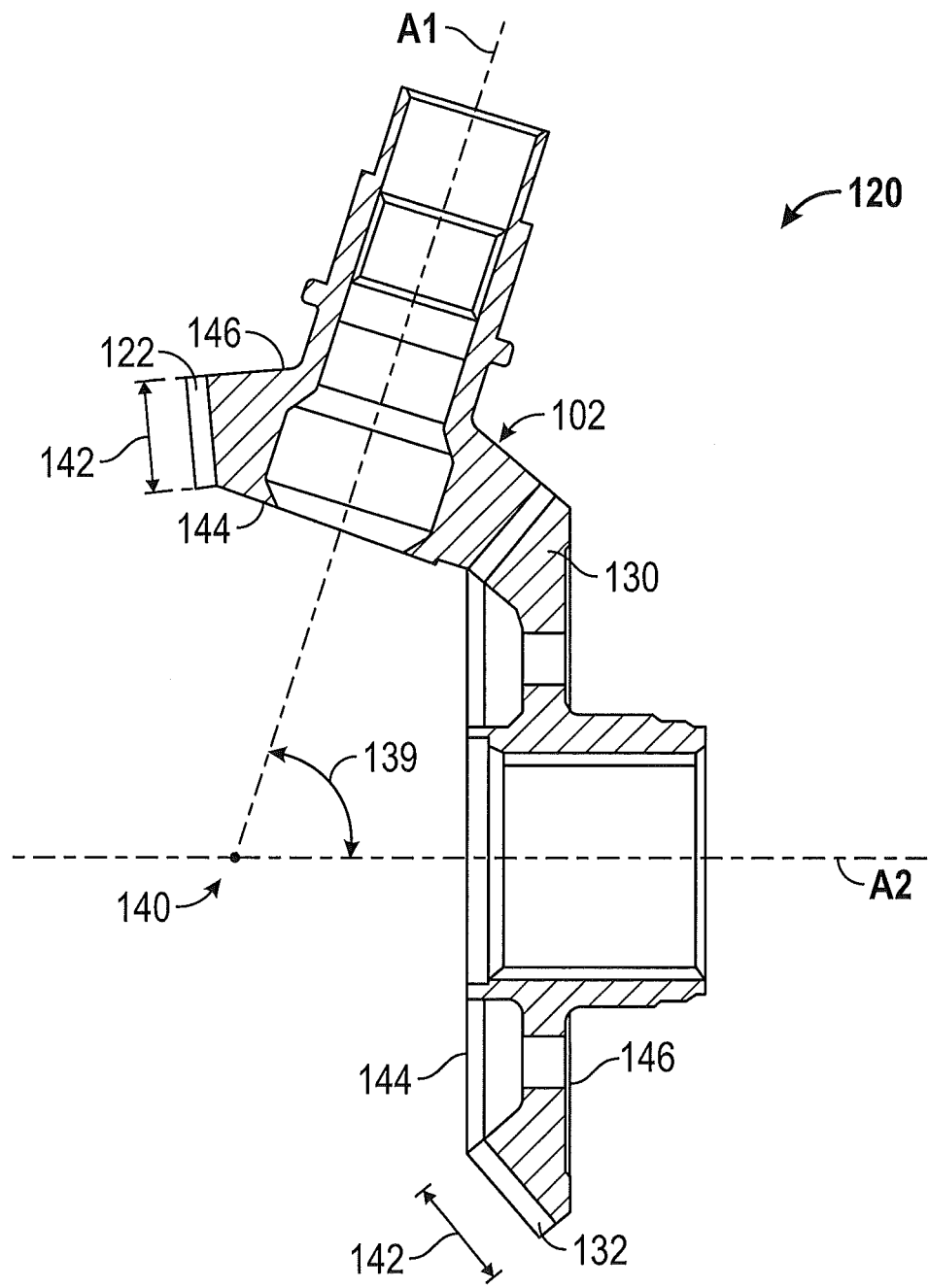
FIG. 3 is a cross-sectional view of the gear assembly of FIG. 1 according to an embodiment of the invention.

Referring now to FIGS. 2 and 3, the first gear 120 and the second gear 130 forming gear set 102 are shown in relation to each other without their respective shafts 124, 134 (FIG. 1) for clarity. The first gear 120 and second gear 130 are generally conical in shape based on an axis, A1 and A2 respectively, that serves as a rotational center.

Each gear 120, 130 has a small diameter end section 144 and a large diameter end section 146 at two different positions along their rotational axes A1, A2, respectively. The small diameter end section 144 forms the toe of the teeth and the large diameter end section 146 of a gear forms the heel of the teeth. The teeth 122 of the first gear 120 and the teeth 132 of the second gear 130 each share a common face width 142. The face width 142 is the length taken along the pitch P of the gear teeth 122, 132 of each of the first gear 120 and the second gear 130. In one embodiment, the face width 142 of both the first gear 120 and the second gear 130 is about 0.62 inches, or about 1.575 centimeters. It shall be understood that while the face width 142 is illustrated as being the same in both the first and second gears 120, 130, each could have a unique width.

The pitch apex 140 (also shown in FIGS. 4 and 5) of the gear assembly or gear set 102 is the point where the axis A1 of the engine shaft 124 (FIG. 1) and the axis A2 of the second shaft 134 (FIG. 1) intersect. Each of the first gear 120 and the second gear 130 are mounted a distance from the apex 140. The mounting distance is a function of the required meshing between the teeth of each of the first gear 120 and the second gear 130. The mounting distance is also a function of the angular relationship between the engine shaft 124 (FIG. 1) and the second shaft 134 (FIG. 1). The engine shaft (FIG. 1) rotates about axis A1 at an angle 139 relative to the axis A2 of the second shaft 134 (FIG. 1). In the illustrated example, the angle 139 is about 86.8 degrees.

Figure 4:
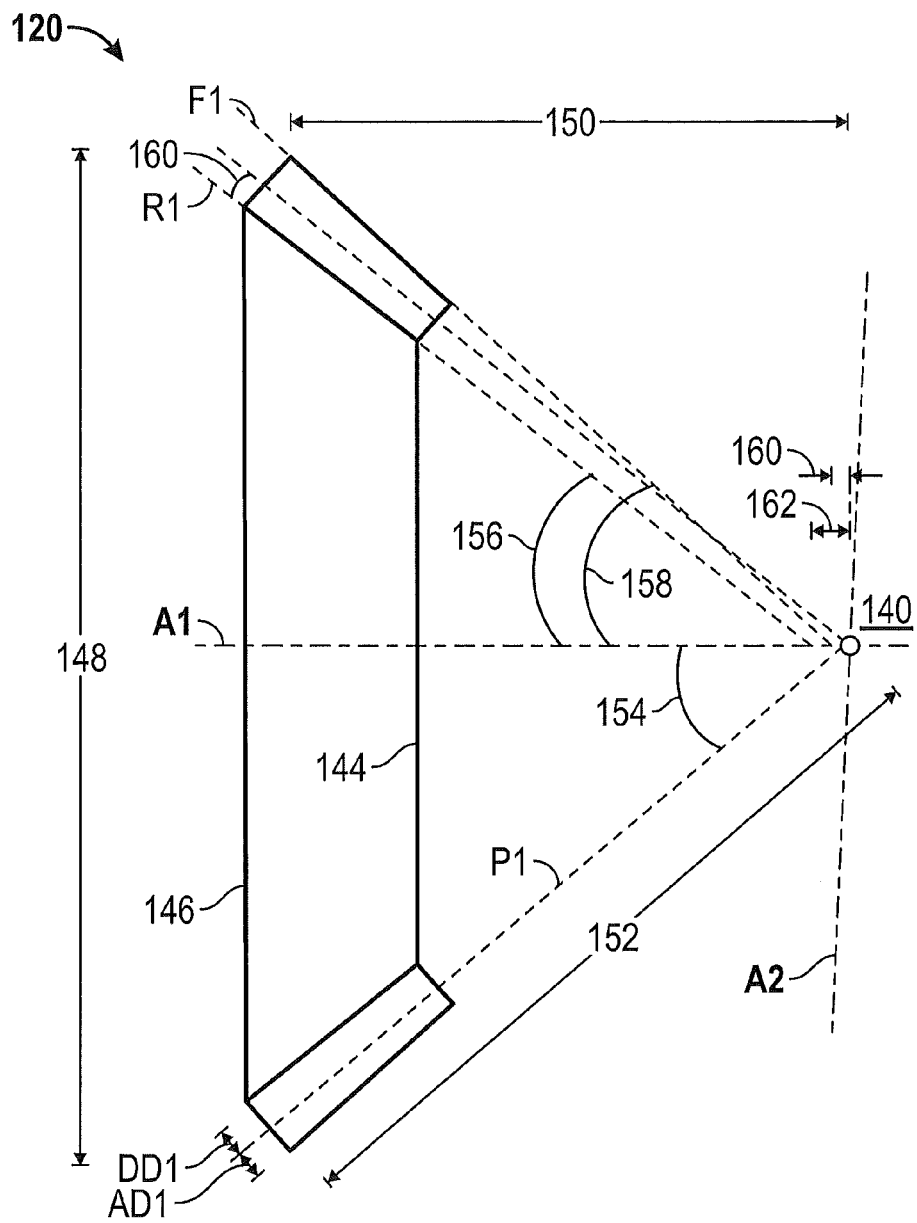
FIG. 4 is a cross-sectional view of the first gear in the gear assembly of FIG. 1 according to an embodiment of the invention.
Figure 5:
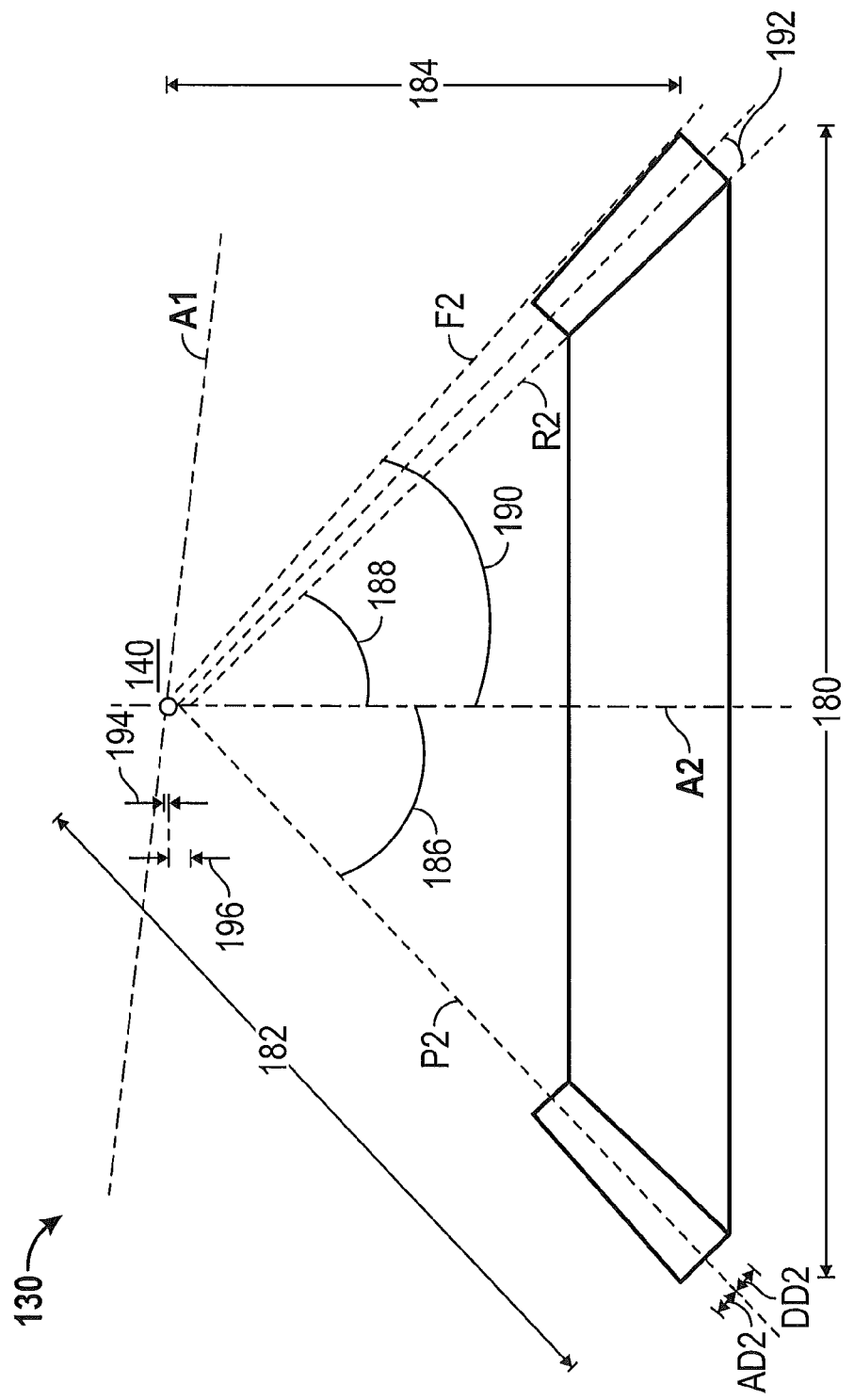
FIG. 5 is a cross-sectional view of the second gear in the gear assembly of FIG. 1 according to an embodiment of the invention.

A cross-sectional view is shown for both the first gear 120 and the second gear 130 in FIGS. 4 and 5, respectively. Each of the first gear 120 and the second gear 130 has a length parallel to the axis of rotation between a crown of the gear and the pitch apex 140. In this example, the first gear 120 includes a length 150 parallel to the axis of rotation A1 between pitch apex 140 and the crown, and the second gear 130 includes a length 184 parallel to the axis of rotation A2 between the pitch apex 140 and the crown. In one embodiment, the length 150 is approximately 1.5584 inches, 3.958 centimeters and the length 184 is approximately 1.3724 inches, 3.486 centimeters. The first gear 120 has an outside diameter 148 and the second gear has an outside diameter 180. In one embodiment, the outside diameter 148 of the first gear 120 is about 2.8337 inches (about 7.198 centimeters) and the outside diameter 180 of the second gear 130 is about 3.1956 inches (about 8.117 centimeters). Alternately, each gear may be measured by the ratio of the outside diameter to the length parallel to the axis of rotation between the crown and the pitch apex. In one embodiment, this ratio for the first gear 120 is about 1.82 and for the second gear 130 is about 2.33. Both the first gear 120 and the second gear 130 also have an outer cone distance extending from the crown to the apex 140 parallel to the pitch cone P. In this example, the first gear 120 has an outer cone distance 152 and the second gear 130 has an outer cone distance 182 which are equal and about 2.1044 inches (about 5.345 centimeters).

Gears 120, 130 include respective root cones R1, R2 extending along the conical root of a tooth and respective face cones F1, F2 extending along the conical face of a tooth. The root cones R1, R2 and face cones F1, F2 intersect the respective rotational axes A1, A2 of the respective gears 120, 130 to form a root angle and a face angle. In one embodiment, the first gear 120 has a root angle 156 of about 37.492 degrees and a face angle 158 of about 42.742 degrees. The second gear 130 has a root angle 188 of about 44.061 degrees and a face angle 190 of about 49.308 degrees. Each gear 120, 130 has a respective pitch axis P1, P2 that forms an angle with the respective rotational axes A1, A2 of each respective gear 120, 130. In one embodiment, the pitch angle 154 of the first gear 120 is about 39.909 degrees and the pitch angle 186 of the second gear 130 is about 46.891 degrees.

The location where each respective root cone R1, R2 and each respective face cone F1, F2 intersects a respective rotational axis A1, A2 can be measured as a distance from the pitch apex 140. For the first gear 120, the crossing point of the root cone R1 is a distance 162 from apex 140 and the crossing point of the face cone F1 is a distance 160 from apex 140. Distance 196 is the distance between the apex 140 and the crossing point of the root cone R2 and length 194 is the distance between apex 140 and the crossing point of the face cone F2 of the second gear 120. In one embodiment, distance 162, where the root cone R1 crosses axis A1, is about 0.315 inches (about 0.800 centimeters) before the apex 140 and distance 160, where the face cone F1 crosses axis A1, is about 0.0252 inches (about 0.064 centimeters) before the apex 140. Similarly, the distance 196, where root cone R2 crosses rotational axis A2, is about 0.0014 inches (about 0.0035 centimeters) before the apex 140 and the distance 194, where the face cone F2 crosses axis A2, is about 0.0016 inches (about 0.004 centimeters) past the apex 140. In this example, the pitch axes P1, P2 for both the first and second gear 120, 130 cross the respective rotational axes A1 and A2 through the apex 140.

Figure 6:
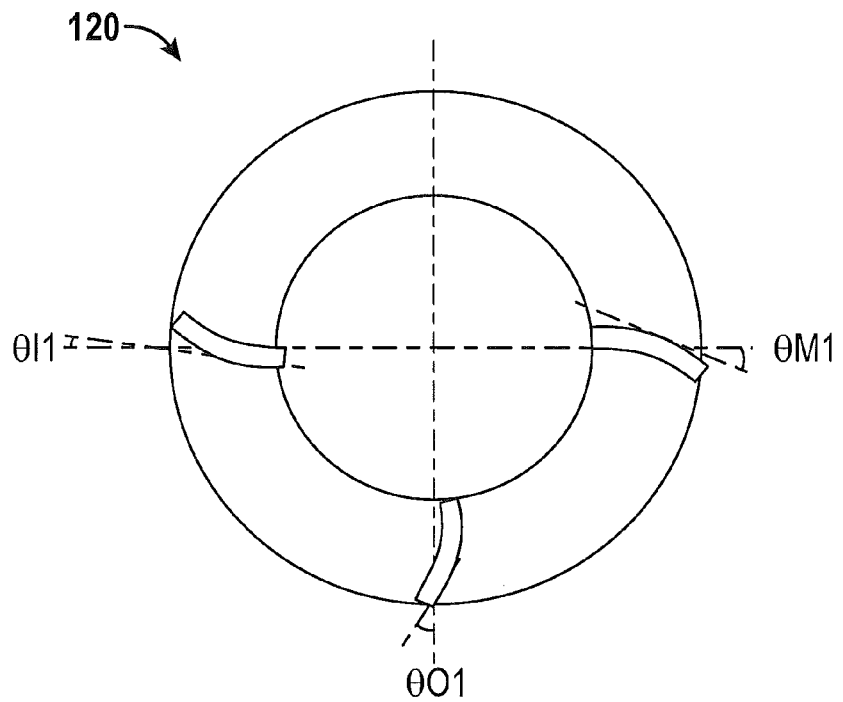
FIG. 6 is an elevation view of the first gear of FIG. 4.
Figure 7:
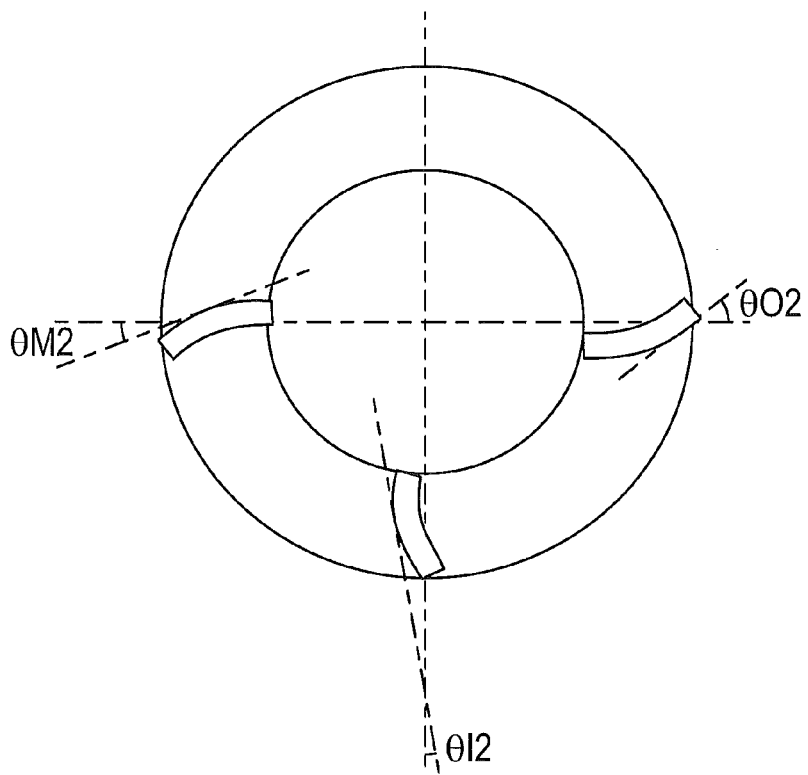
FIG. 7 is an elevation view of the second gear of FIG. 5.

FIGS. 6 and 7 depict elevation views of the first gear 120 and the second gear 130. In one embodiment, the first gear 120 and the second gear 130 are bevel gears having complementary spiral teeth. As such, the teeth 122 of the first gear 120 may have a right-handed spiral and the teeth 132 of the second gear 130 may have a left-handed spiral. A spiral angle is the angle of a gear tooth relative to the pitch cone and is selected to provide a desired length of contact balanced with the thrust load generated by the torque on each gear. The spiral angle may be measured at various points along the face of the tooth. For example, the outer spiral angle is measured at the outer cone distance, the inner spiral angle is measured at the inner cone distance, and the mean spiral angle is measured at the mean cone distance. For the teeth of the first gear 120 and the second gear 130 to mate properly, the spiral angle is common to both the first gear 120 and the second gear 130. In one embodiment, the inner spiral angle $\theta I1$, $\theta I2$ is about 25.715 degrees, the outer spiral angle $\theta O1$, $\theta O2$ is about 32.753 degrees and the mean spiral angle is about 29 degrees.

Figure 8:
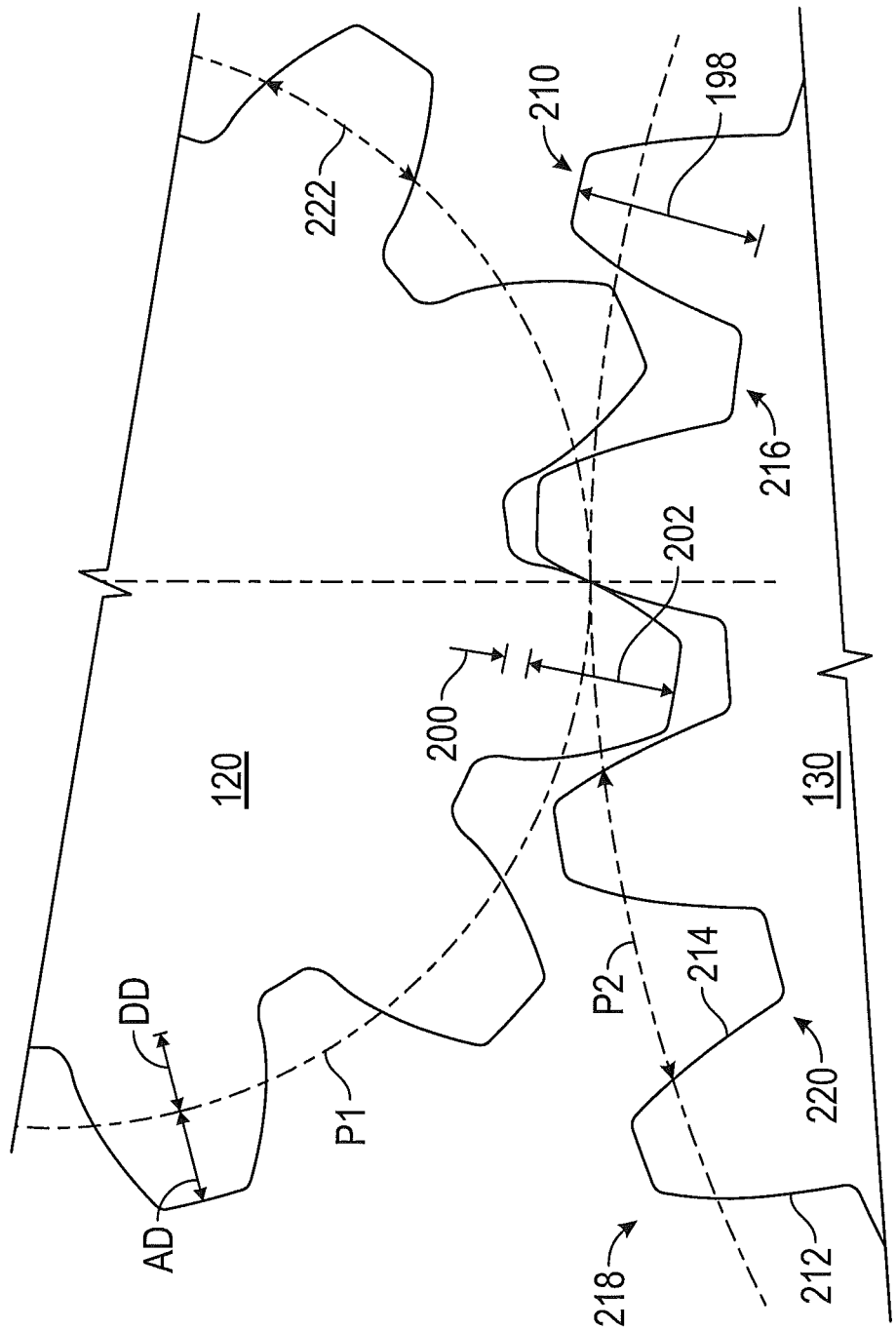
FIG. 8 is a planar view of the mated gear set according to an embodiment of the invention.

Referring now to FIG. 8, the whole depth 198 of a gear tooth is the distance from the root of the tooth to the face of the tooth. The whole depth 198 is equal to the sum of the length of the addendum AD and the length of the dedendum DD. In one embodiment, the first gear 120 and the second gear 130 have a whole depth of about 0.1950 inches (about 0.4953 centimeters). The dedendum DD of a gear is the radial distance from the root of a tooth to the pitch cone P as measured at the heel. The addendum AD is the radial distance from the pitch cone P to the face cone F of a tooth as measured at the heel. In one example, the first gear 120 has a dedendum DD1 of about 0.108 inches (about 0.274 centimeters) and an addendum AD1 of about of 0.087 inches (about 0.221 centimeters) and the second gear 130 has a dedendum DD2 of about 0.105 inches (about 0.2667 centimeters) and an addendum of about 0.090 inches (about 0.228 centimeters). The clearance 200 of a gear is the distance between the root of a first gear 120 and the face of the second gear 130 when mated. In one embodiment, the first gear 120 and the second gear 130 have a clearance of about 0.0180 inches (about 0.0457 centimeters). The working depth 202 of a gear is the difference between the whole depth 198 of a gear and the clearance 200. Therefore, the working depth 202 of the first and second gear 120, 130 is about 0.1770 inches (about 0.4496 centimeters). The dedendum angle is the angle formed between the pitch cone P and the root cone R of a gear. In one embodiment, the dedendum angle 160 of the first gear 120 is about 2.417 degrees and the dedendum angle 192 of the second gear 130 is about 2.83 degrees.

Each tooth includes a topland 210, a convex tooth flank 212 and a concave tooth flank 214. Root cone 216 is continuously formed at the tooth root between the convex and concave flanks 212, 214 of adjacent teeth. In general, the topland 210 connects to the convex and concave tooth flanks 212, 214 by a tooth crest arc 218 and the concave and convex tooth flanks 212, 214 connect to the root cone 216 by a tooth root arc 220. The width of the topland 210 may vary along the length of the tooth. The width of the topland is measured at the toe, the heel, and halfway between the toe and the heel. In one embodiment, the first gear 120 has an inner topland, measured at the toe, of about 0.0415 inches (about 0.1054 centimeters), an outer topland, measured at the heel, of about 0.0362 inches (about 0.0919 centimeters) and a mean topland of 0.0386 inches (about 0.0980 centimeters). Similarly, the second gear 130 may have an inner topland, measured at the toe, of about 0.0398 inches (about 0.1011 centimeters), and an outer topland, measured at the heel, of about 0.0571 inches (about 0.145 centimeters), and a mean topland of 0.0526 inches (approximately 0.1336 centimeters). The mean circular thickness 222 of a tooth is the average width of a tooth measured along the arc of the pitch circle. In one embodiment, the mean circular thickness 222 of the first gear 120 is approximately 0.1096 inches (approximately 0.2784 centimeters) and the second gear 130 is approximately 0.1291 inches (approximately 0.0508 centimeters).

Figure 9:
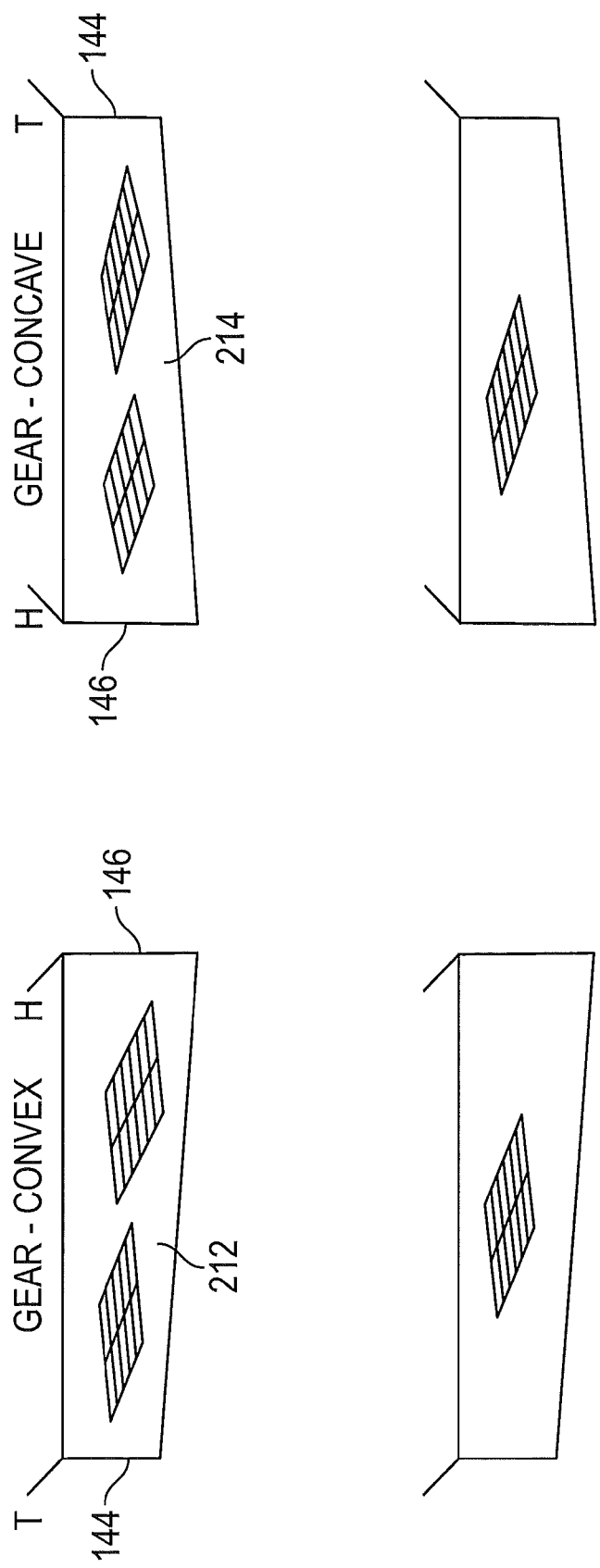
FIG. 9 is a contact pattern check of the gear set according to an embodiment of the invention.

FIG. 9 illustrates a contact pattern check of the gear set 102 and the maximum amount that the first gear 120 may be moved relative to the second gear 130 to maintain sufficient contact for clean visual inspection. These maximum tolerances regarding the positioning of the first gear 120 relative to the second gear 130 are listed in Table 1. Table-1

| IN * 1000 | Mean | Toe | Heel | Total |
|---|---|---|---|---|
| CX E(V) | 0 | 12 | −10 | 22 |
| CX P(H) | 0 | 0 | 14 | 14 |
| CV E(V) | 0 | −22 | 18 | 40 |
| CV P(H) | 0 | 16 | 0 | 16 |

In one embodiment, when the first gear 120 is shifted about 0.012 inches (about 0.030 centimeters) along axis E (see FIG. 2) relative to the second gear, the first gear 120 contacts the convex flank 212 of the second gear 130 near the toe 144 of the second gear 130. If the first gear 120 is shifted about −0.010 inches (about −0.0254 centimeters) along axis E and about 0.014 inches (about 0.0356 centimeters) along axis A1, the first gear 120 will contact the convex flank 212 of the second gear 130 near the heel 146 of the second gear 130. Shifting the first gear 120 about −0.022 inches (about −0.0559 centimeters) along the E axis and about 0.016 inches (about 0.0406 centimeters) along the A1 axis will cause the first gear 120 to contact the concave flank 214 of the second gear 130 near the toe 144 of the second gear 130. If the first gear 120 is shifted about 0.018 inches (about 0.0457 centimeters) along axis E, the first gear 120 will contact the concave flank 214 of the second gear 130 near the heel 146 of the second gear 130.

Figure 10:
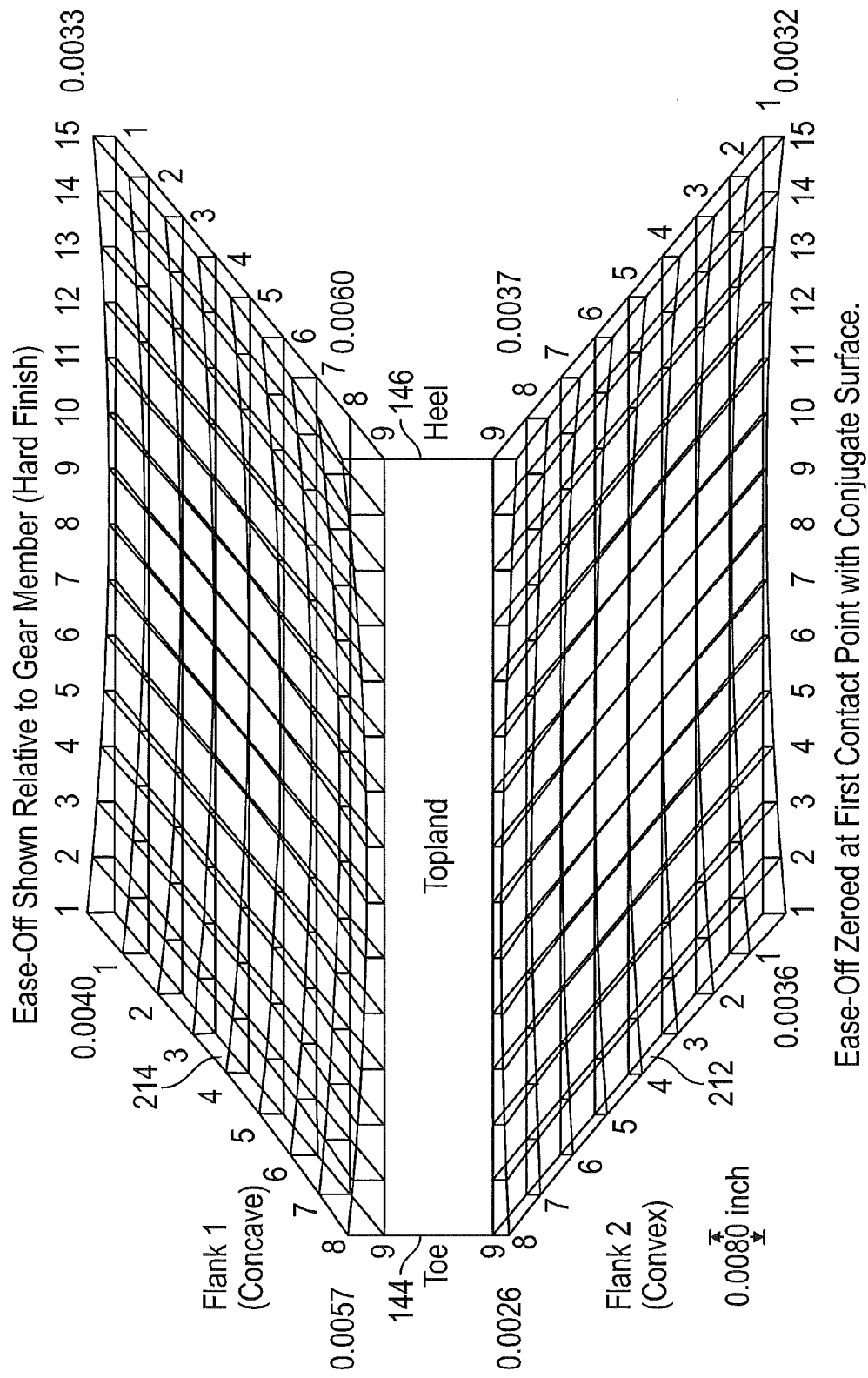
FIG. 10 is an ease-off grid of the normalized tooth profile of the gear set according to an embodiment of the invention.

Referring now to FIG. 10, an ease-off grid illustrates the normalized tooth profile of a first gear 120 overlapped with the normalized tooth profile of a second gear 130. A profile modification is added to each contact corner to create a smooth overlapping surface. In an exemplary embodiment, the profile modifications for the convex flank (generally shown at 212) include about 0.0026 inches (about 0.0066 centimeters) at the top of the toe 144, 0.0036 inches, 0.0091 centimeters at the root of the toe 144, about 0.0037 inches (about 0.0094 centimeters) at the top of the heel 146, and (about 0.0032 inches (about 0.0081 centimeters) at the root of the heel 146. The profile modifications for the concave flank (generally shown at 214) may be about 0.0056 inches (about 0.0142 centimeters) at the top of the toe 144, about 0.0040 inches (about 0.0102 centimeters) at the root of the toe 144, about 0.0060 inches (about 0.0152 centimeters) at the top of the heel 146, and about 0.0033 inches (about 0.0084 centimeters) at the root of the heel 146. The profile modification at each corner may be split between the first gear and the second gear. For example, the first gear may be modified the total profile modification amount, the second gear may be modified the total profile modification amount, or the first gear and the second gear may each be modified an amount totaling the profile modification amount at that corner.

The above description details particular dimensions of gears in a set according to one embodiment. One or ordinary skill will realize that additional dimensions could be specified and the values of those could be modified without departing from the present invention. Examples of additional dimensions of the first gear 120 and the second gear 130 and their approximate values may be found in included Table 2.

TABLE 2

| | First Gear | Second Gear |
|---|---|---|
| Pitch Diameter | 2.700" | 3.073" |
| Outer Slot Width | .059" | .040" |
| Mean Slot Width | .051" | .040" |
| Inner Slot Width | .039" | .040" |
| Pitch Apex to Crown | 1.558" | 1.372" |
| Edge Radius | .120" | .150" |
| Maximum Allowable Edge Radius | .150" | .150" |
| Maximum Edge Radius Geometry | .0233" | .0207" |
| Maximum Edge Radius Mutilation | .0292" | .0412" |
| Maximum Edge Radius Interference | .0198" | .0196" |
| Crown to Crossing Point | 1.5584" | 1.3724 |

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A gear comprising:
   a conical base having an inner end section and an outer end section at two different positions along a rotational axis;
   a plurality of teeth extending from a surface of the conical base between the inner end section and the outer end section wherein each tooth has a root, a pitch and a face;
   wherein the gear has an outside diameter of about 2.8337 inches, an outer cone distance of about 2.1044 inches, a face width of about 0.62 inches, and a ratio of the outside diameter to a length parallel to the axis of rotation between the crown and the pitch apex of about 1.82.

2. The gear according to claim 1, wherein the gear has an addendum of about 0.087 inches, a dedendum of about 0.108 inches and a dedendum angle of about 2.417 degrees.

3. The gear according to claim 1, wherein the gear has a face cone, a pitch cone, and a root cone all of which intersect with the rotational axis of the gear, wherein the root cone intersects the rotational axis at about 0.0315 inches before the pitch cone intersects the rotational axis and the face cone intersects the rotational axis at about 0.0252 inches before the pitch cone intersects the rotational axis.

4. The gear according to claim 1, wherein the gear has a pitch angle of about 39.909 degrees, a face angle of about 42.742 degrees and a root angle of about 37.492 degrees.

5. The gear according to claim 1, wherein each of the teeth has a mean circular thickness of about 0.110 inches, an inner normal topland of about 0.0415 inches, an outer normal topland of about 0.0362 inches and a mean normal topland of about 0.0386 inches.

6. The gear according to claim 1, wherein each of the teeth has an inner spiral angle of about 25.715 degrees, an outer spiral angle of about 32.753 degrees and a mean spiral angle of 29 degrees.

7. A gear comprising:
   a generally conical base having an inner end section and an outer end section at two different positions along a rotational axis;
   a plurality of teeth extending from the surface of the base between the inner end section and the outer end section, wherein each tooth has a root, a pitch and a face;
   wherein the gear has an outside diameter of about 3.1956 inches, an outer cone distance of about 2.1044 inches, a face width of about 0.62 inches, and a ratio of the outside diameter to a length parallel to the axis of rotation between the crown and the pitch apex of about 2.33.

8. The gear according to claim 7, wherein the gear has an addendum of about 0.09 inches, a dedendum of about 0.105 inches and a dedendum angle of about 2.83 degrees.

9. The gear according to claim 7, wherein the gear has a face cone, a pitch cone, and a root cone all of which intersect with the rotational axis of the gear, wherein the root cone intersects the rotational axis at about 0.0014 inches before the pitch cone intersects the rotational axis and the face cone intersects the rotational axis at about 0.0016 inches after the pitch cone intersects the rotational axis.

10. The gear according to claim 7, wherein the gear has a pitch angle of about 46.891 degrees, a face angle of about 49.308 degrees and a root angle of about 44.061 degrees.

11. The gear according to claim 7, wherein each of the teeth has a mean circular thickness of about 0.1291 inches, an inner normal topland of about 0.0398 inches, an outer normal topland of about 0.0571 inches and a mean normal topland of about 0.0526 inches.

12. The gear according to claim 7, wherein each of the teeth has an inner spiral angle of about 25.72 degrees, an outer spiral angle of about 32.75 degrees and a mean spiral angle of about 29 degrees.

13. A gear set for use in a gearbox comprising:
    a first gear having a first rotational axis;
    a second gear having a second rotational axis, wherein the second gear is driven by the first gear;
    wherein the first gear has an outside diameter of about 3.1956 inches, an outer cone distance of about 2.1044 inches, a face width of about 0.62 inches and a ratio of the outside diameter to a length parallel to the axis of rotation between the crown and the pitch apex of about 1.83; and
    wherein the second gear has an outside diameter of about 2.8337 inches, an outer cone distance of about 2.1044 inches, a face width of about 0.62 inches, and a ratio of the outside diameter to a length parallel to the axis of rotation between the crown and the pitch apex of about 2.33.

14. The gear set according to claim 13, wherein the first gear has an addendum of about 0.087 inches, a dedendum of about 0.108 inches and a dedendum angle of about 2.417 degrees and the second gear has an addendum of about 0.09 inches, a dedendum of about 0.105 inches and a dedendum angle of about 2.83 degrees.

15. The gear set according to claim 14, wherein the first gear has a first face cone, a first pitch cone, and a first root cone all of which intersect with the first rotational axis, and the second gear has a second face cone, a second pitch cone and a second root cone all of which intersect the second rotational axis;
    wherein the first root cone intersects the first rotational axis about 0.0315 inches before the first pitch cone intersects the first rotational axis and the first face cone intersects the first rotational axis about 0.0252 inches before the first pitch cone intersects the first rotational axis; and
    wherein the second root cone intersects the second rotational axis about 0.0014 inches before the second pitch cone intersects the second rotational axis and the second face cone intersects the second rotational axis about 0.0016 inches after the second pitch cone intersects the second rotational axis.

16. The gear set according to claim 13, wherein the first gear has a first pitch angle of about 39.909 degrees, a first face angle of about 42.742 degrees and a first root angle of about 37.492 degrees and the second gear has a second pitch angle of about 46.891 degrees, a second face angle of about 49.308 degrees and a second root angle of about 44.061 degrees.

17. The gear set according to claim 13, wherein when the first gear is shifted 0.012 inches along a first axis that is orthogonal to the first rotational axis, the first gear contacts a convex flank of the second gear near a second gear toe; wherein when the first gear is shifted about −0.010 inches along the first axis and about 0.014 inches along the first rotational axis, the first gear will contact the convex flank near a second gear heel; wherein shifting the first gear about −0.022 inches along the first axis and about 0.016 inches along its rotational axis will cause the first gear to contact a concave flank of the second gear near the second gear toe; and wherein shifting the first gear about 0.018 inches along the first axis will cause the first gear to contact the concave flank of the second gear near the second gear heel.

18. The gear set according to claim 13, wherein when a tooth profile of the first gear and a tooth profile of the second gear are normalized and overlapped, the total profile modification of a convex flank is about 0.0026 at a top toe, about 0.0036 at a root toe, about 0.0037 at a top heel, and about 0.0032 at a root heel and wherein the total profile modification of a concave flank is about 0.0057 at a top toe, about 0.0040 at a root toe, about 0.0060 at a top heel, and about 0.0033 at a root heel.

* * * * *